US010142432B2

(12) United States Patent
Vasanthasenan et al.

(10) Patent No.: US 10,142,432 B2
(45) Date of Patent: Nov. 27, 2018

(54) REDIRECTION OF A SESSION INITIATION PROTOCOL INVITE

(71) Applicant: QUALCOMM Incorporated, San Diego, CA (US)

(72) Inventors: KrishnaKumar Vasanthasenan, Hyderabad (IN); Prashanth Mohan, Chennai (IN); Abhilash Singh Rajpoot, Hyderabad (IN); Parthasarathy Krishnamoorthy, San Diego, CA (US); Naveen Kumar Pasunooru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/427,829

(22) Filed: Feb. 8, 2017

(65) Prior Publication Data

US 2018/0227383 A1 Aug. 9, 2018

(51) Int. Cl.
H04L 12/66 (2006.01)
H04L 29/08 (2006.01)
(Continued)

(52) U.S. Cl.
CPC ...... *H04L 67/2814* (2013.01); *H04L 65/1006* (2013.01); *H04L 65/1016* (2013.01);
(Continued)

(58) Field of Classification Search
CPC ............. H04L 67/2814; H04L 65/1069; H04L 65/1006; H04W 76/10; H04W 76/02; H04W 8/02; H04W 80/04
See application file for complete search history.

(56) References Cited

U.S. PATENT DOCUMENTS

2007/0140246 A1* 6/2007 Rajagopalan ..... H04L 29/06027
370/392
2007/0281704 A1* 12/2007 Lin ....................... H04W 68/12
455/445
(Continued)

OTHER PUBLICATIONS

Rosenberg et al., "RFC 3261, SIP: Session Initiation Protocol," Internet Engineering Task Force, Network Working Group, Jun. 2002, 314 Pages, Retrieved from the Internet: URL: https://www.ietf.org/rfc/rfc3261.txt.

(Continued)

*Primary Examiner* — Clemence S Han
(74) *Attorney, Agent, or Firm* — Holland & Hart, LLP

(57) ABSTRACT

Methods, systems, and devices for wireless communication are described for redirection of a session initiation protocol (SIP) INVITE. A multi-subscriber identification module user equipment (multi-SIM UE) may intelligently determine when to redirect a SIP INVITE message to control on which of multiple networks a communication session is established. The multi-SIM UE may receive a SIP INVITE from a first user equipment (UE) requesting to establish a SIP session on a first network, the SIP INVITE including a first network address of the multi-SIM UE that is associated with a first SIM of the multi-SIM UE. The multi-SIM UE may, based at least in part on determining that a redirection criterion is satisfied, transmit a SIP redirection response including a second network address of the multi-SIM UE on a second network that is associated with a second SIM of the multi-SIM UE.

30 Claims, 11 Drawing Sheets

(51) Int. Cl.
   *H04L 29/06* (2006.01)
   *H04W 8/02* (2009.01)
   *H04W 76/10* (2018.01)
   *H04W 80/04* (2009.01)

(52) U.S. Cl.
   CPC ........... *H04L 65/1069* (2013.01); *H04W 8/02* (2013.01); *H04W 76/10* (2018.02); *H04W 80/04* (2013.01)

(56) References Cited

U.S. PATENT DOCUMENTS

| | | | |
|---|---|---|---|
| 2009/0034471 A1* | 2/2009 | Rosenblatt | H04W 36/0022 370/331 |
| 2009/0047922 A1* | 2/2009 | Buckley | H04L 63/08 455/404.1 |
| 2013/0208676 A1* | 8/2013 | Klein | H04L 65/1016 370/329 |
| 2014/0171038 A1 | 6/2014 | Singvall et al. | |
| 2014/0364118 A1* | 12/2014 | Belghoul | H04W 68/12 455/435.1 |
| 2015/0092611 A1* | 4/2015 | Ponukumati | H04W 4/16 370/259 |
| 2015/0281929 A1* | 10/2015 | Shih | H04W 4/90 455/404.1 |
| 2015/0319196 A1 | 11/2015 | Noldus et al. | |
| 2016/0142998 A1* | 5/2016 | Tsai | H04B 1/3816 455/458 |
| 2017/0105193 A1* | 4/2017 | Liu | H04W 68/12 |
| 2017/0265114 A1* | 9/2017 | Sahu | H04W 36/14 |

OTHER PUBLICATIONS

ISA/EP, International Search Report and Written Opinion of the International Searching Authority, Int'l Application No. PCT/US2017/062855, dated Feb. 8, 2018, European Patent Office, Rijswijk, NL, 14 pgs.

* cited by examiner

REDIRECTION OF A SESSION INITIATION PROTOCOL INVITE

BACKGROUND

The following relates generally to wireless communication, and more specifically to redirection of a session initiation protocol (SIP) INVITE.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Session initiation protocol (SIP) is a protocol used to establish a communication session (e.g., a voice call, a video call, or the like), between multiple devices, such a calling UE and a called UE. SIP defines messages that are sent between UEs, which govern establishment, termination and other essential elements of the communication session. Internet Protocol Multimedia Subsystem (IMS) is a set of specifications for offering multimedia services using the internet protocol (IP), and SIP may be used for the signaling to establish the communication session for transporting the multimedia services. To obtain IMS multimedia services, a UE registers with an IMS server. In some instances, a UE may have multiple subscriber identity module (SIM) cards. Each SIM card may correspond to a subscription for a service with a particular network provider, and the UE may separately register each SIM card with a same or different IMS server. A multi-SIM UE, however, may have issues with establishing communication sessions not contemplated by conventional systems.

SUMMARY

The described techniques relate to improved methods, systems, devices, or apparatuses that support redirection of a session initiation protocol (SIP) INVITE. Conventional systems do not intelligently manage session establishment for a multi-subscriber identification module user equipment (multi-SIM UE). A user may purchase a subscription to obtain network service from a network provider, and a SIM card may be placed in the user's UE to enable the user to obtain service from the network provider in accordance with the subscription. In some instances, the user may purchase subscriptions from different network providers that operate different networks. Each network may charge its own set of fees, and the UE may be able to establish the same communication session (e.g., for a voice call, for streaming video, or the like) over any of the networks.

Network providers, however, do not intelligently determine when to redirect a SIP INVITE to control on which of the multiple networks a communication session is established. There may be instances when it may be better, from a cost perspective or from a perspective of channel quality of wireless communications channel, for a UE to establish a communication session using one network instead of another.

In the examples described herein, a multi-SIM UE may determine whether to redirect a SIP INVITE to intelligently select which network of multiple networks to use for establishing a communication session, such as a SIP session. In an example, the multi-SIM UE may receive a SIP INVITE from a calling UE requesting to establish a SIP session on a first network. The SIP INVITE may include a first network address of the multi-SIM UE that is associated with a first SIM of the multi-SIM UE. The multi-SIM UE may determine that a redirection criterion is satisfied, and based at least in part on determining that the redirection criterion is satisfied, transmit a SIP redirection response including a second network address of the multi-SIM UE on a second network that is associated with a second SIM of the multi-SIM UE.

A method of wireless communication is described. The method may include receiving, by a multi-SIM UE, a SIP INVITE from a first UE requesting to establish a SIP session on a first network, the SIP INVITE including a first network address of the multi-SIM UE that is associated with a first SIM of the multi-SIM UE, determining that a redirection criterion is satisfied, and based at least in part on determining that the redirection criterion is satisfied, transmitting, by the multi-SIM UE, a SIP redirection response including a second network address of the multi-SIM UE on a second network that is associated with a second SIM of the multi-SIM UE.

An apparatus for wireless communication is described. The apparatus may include means for receiving a SIP INVITE from a first UE requesting to establish a SIP session on a first network, the SIP invite including a first network address of a multi-SIM UE that is associated with a first SIM of the multi-SIM UE, means for determining that a redirection criterion is satisfied, and means for transmitting a SIP redirection response including a second network address of the multi-SIM UE on a second network that is associated with a second SIM of the multi-SIM UE based at least in part on determining that the redirection criterion is satisfied.

Another apparatus for wireless communication is described. The apparatus may include a processor, memory in electronic communication with the processor, and instructions stored in the memory. The instructions may be operable to cause the processor to receive a SIP INVITE from a first UE requesting to establish a SIP session on a first network, the SIP INVITE including a first network address of a multi-SIM UE that is associated with a first SIM of the multi-SIM UE, determine that a redirection criterion is satisfied, and based at least in part on determining that the redirection criterion is satisfied, transmit a SIP redirection response including a second network address of the multi-SIM UE on a second network that is associated with a second SIM of the multi-SIM UE.

A non-transitory computer readable medium for wireless communication is described. The non-transitory computer-readable medium may include instructions operable to cause a processor to receive a SIP INVITE from a first UE requesting to establish a SIP session on a first network, the SIP INVITE including a first network address of a multi-SIM UE that is associated with a first SIM of the multi-SIM UE, determine that a redirection criterion is satisfied, and based at least in part on determining that the redirection criterion is satisfied, transmit a SIP redirection response including a second network address of the multi-SIM UE on a second network that is associated with a second SIM of the multi-SIM UE.

In some examples of the method, apparatus, and non-transitory computer-readable medium described above, determining that the redirection criterion may be satisfied comprises determining that a first condition of a first communication channel associated with the first network does not satisfy a threshold. Some examples of the method, apparatus, and non-transitory computer-readable medium described above may further include processes, features, means, or instructions for determining that a second condition of a second communication channel associated with the second network satisfies the threshold.

In some examples of the method, apparatus, and non-transitory computer-readable medium described above, determining that the redirection criterion may be satisfied comprises determining that the first network may be a non-home network and the second network may be a home network.

Some examples of the method, apparatus, and non-transitory computer-readable medium described above may further include processes, features, means, or instructions for establishing, by the multi-SIM UE, the SIP session on the second network based at least in part on the second network address.

In some examples of the method, apparatus, and non-transitory computer-readable medium described above, establishing the SIP session on the second network comprises initiating a handshake for establishment of the SIP session on the second network based at least in part on receiving a second SIP INVITE requesting to establish the SIP session on the second network. Some examples of the method, apparatus, and non-transitory computer-readable medium described above may further include processes, features, means, or instructions for transmitting a SIP acceptance response to indicate acceptance of the second SIP INVITE. Some examples of the method, apparatus, and non-transitory computer-readable medium described above may further include processes, features, means, or instructions for receiving an acknowledgment of the SIP acceptance response that completes the handshake and establishes the SIP session on the second network.

Some examples of the method, apparatus, and non-transitory computer-readable medium described above may further include processes, features, means, or instructions for performing a first Internet Protocol Multimedia Subsystem (IMS) registration procedure to register a first subscription associated with the first SIM with the first network and to obtain the first network address for the multi-SIM UE on the first network. Some examples of the method, apparatus, and non-transitory computer-readable medium described above may further include processes, features, means, or instructions for performing a second IMS registration procedure to register a second subscription associated with the second SIM with the second network and to obtain the second network address for the multi-SIM UE on the second network.

Some examples of the method, apparatus, and non-transitory computer-readable medium described above may further include processes, features, means, or instructions for initiating a timer based at least in part on a transmission time of the SIP redirection response. Some examples of the method, apparatus, and non-transitory computer-readable medium described above may further include processes, features, means, or instructions for terminating the timer prior to expiration of the timer based at least in part on determining successful establishment of the SIP session on the second network.

Some examples of the method, apparatus, and non-transitory computer-readable medium described above may further include processes, features, means, or instructions for receiving a second SIP INVITE from the first UE or a second UE requesting to establish a second SIP session on the first network. Some examples of the method, apparatus, and non-transitory computer-readable medium described above may further include processes, features, means, or instructions for transmitting a second SIP redirection response that includes the second network address. Some examples of the method, apparatus, and non-transitory computer-readable medium described above may further include processes, features, means, or instructions for initiating the timer based at least in part on a transmission time of the second SIP redirection response. Some examples of the method, apparatus, and non-transitory computer-readable medium described above may further include processes, features, means, or instructions for establishing the second SIP session on the first network based at least in part on determining that the timer may have expired.

In some examples of the method, apparatus, and non-transitory computer-readable medium described above, the first network address may be a uniform resource identifier (URI) associated with the first SIM on the first network and the second network address may be a URI associated with the second SIM on the second network.

In some examples of the method, apparatus, and non-transitory computer-readable medium described above, the SIP redirection response may be one of a SIP 300 response, a SIP 301 response, a SIP 302 response, a SIP 305 response, or a SIP 380 response.

DETAILED DESCRIPTION

Figure 1:
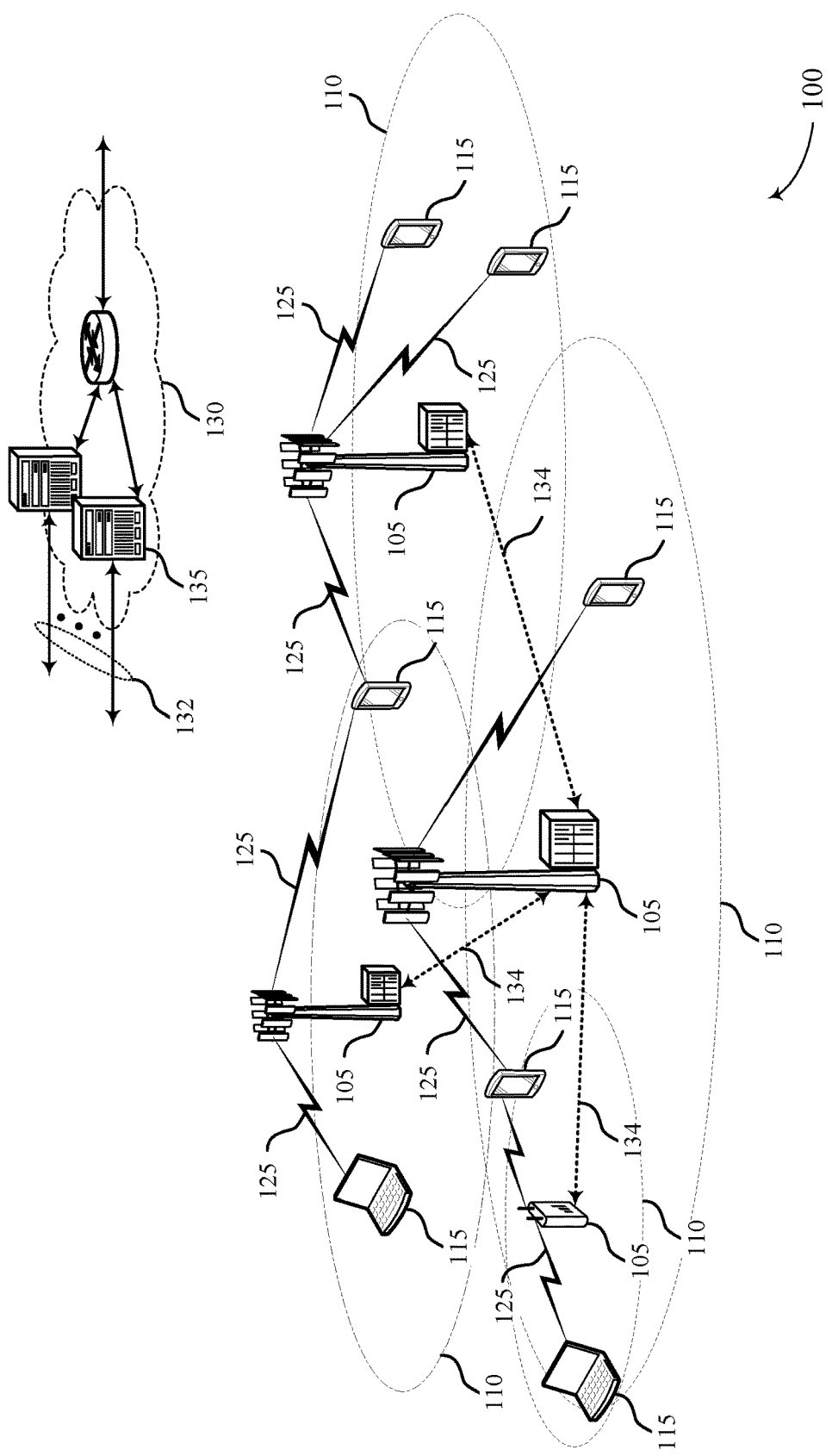
FIG. 1 illustrates an example of a system for wireless communication that supports redirection of a session initiation protocol (SIP) INVITE in accordance with aspects of the present disclosure.

The described techniques relate to improved methods, systems, devices, or apparatuses that support redirection of a session initiation protocol (SIP) INVITE. Conventional systems do not intelligently manage session establishment for a multi-subscriber identification module user equipment (multi-SIM UE). In the examples described herein, a multi-SIM UE may determine whether to redirect a SIP INVITE message to intelligently select which network of multiple networks to use for establishing a communication session.

A user may purchase a subscription to obtain network service from a network provider, and a SIM card may be placed in the user's UE to enable the user to obtain service from the network provider in accordance with the subscription. Each network may charge its own set of fees and the UE may be able to establish the same communication session (e.g., for a voice call, for streaming video, or the like) over any of the networks. The SIM card may include a unique identifier that the user's UE provides to an IMS server during registration to obtain service via a network (e.g., a wireless cellular network) operated by the network provider. The UE may provide the unique identifier each time the UE attempts to obtain network service. In response to a registration request, an IMS server may provide the UE with a network address on its network. The network address of the UE may be used to identify the UE of the network, such that data may be sent to and from the UE. Because the multi-SIM UE may register with multiple networks, the multi-SIM UE may be assigned a network address per SIM card. Thus, a first SIM card of a multi-SIM UE may be assigned a first network address on a first network, a second SIM card of a multi-SIM UE may be assigned a second network address on a second network, and so forth, depending on the number of SIM cards that the UE has.

Conventional network providers, however, do not intelligently determine when to redirect a SIP INVITE to control on which of the multiple networks to establish a communication session. In a conventional system, a calling party may send a SIP INVITE to a multi-SIM UE that includes a network address that the multi-SIM UE obtained on a first network associated with a first SIM card of the multi-SIM UE. The multi-SIM UE may send a SIP response that either accepts or rejects the SIP INVITE. If accepting, a conventional multi-SIM UE can only establish the communication session on the first network, and not the second network. This may cause undue costs if the multi-SIM UE would incur roaming charges when connecting to the first network (and not a second network associated with a second SIM card of the multi-SIM UE when the multi-SIM UE is not roaming). Additionally or alternatively, a user of the multi-SIM UE may have a poor user experience if channel conditions of the first network are bad and the multi-SIM UE has the option of using a second network having comparably better channel conditions.

The example embodiments permit a multi-SIM UE to intelligently determine when to redirect a SIP INVITE to control on which of the multiple networks a communication session, such as a SIP session, is established. In an example, the multi-SIM UE may receive a SIP INVITE from a first UE requesting to establish a SIP session on a first network, the SIP INVITE including a first network address of the multi-SIM UE that is associated with a first SIM of the multi-SIM UE. Based at least in part on determining that a redirection criterion is satisfied, the multi-SIM UE that may transmit a SIP redirection response including a second network address of the multi-SIM UE on a second network that is associated with a second SIM of the multi-SIM UE. The SIP redirection response may request that the SIP session be established using a second network, instead of the first network.

Aspects of the disclosure are initially described in the context of a wireless communications system. The wireless communications system may enable a multi-SIM UE intelligently to determine when to redirect a SIP INVITE to control on which of the multiple networks a SIP session is established. Aspects of the disclosure are further illustrated by and described with reference to apparatus diagrams, system diagrams, and flowcharts that relate to redirection of a SIP INVITE.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

One or more of the UEs 115 may include multiple SIM cards. Each of the SIM cards may be associated with a subscription from a network provider to obtain network service from a network operated by a corresponding network provider. A SIM card may be associated with a unique identifier. A UE 115 may provide the unique identifier of each SIM card to a corresponding IMS server 135 during registration of a corresponding subscription. If registration is successful, the UE 115 may receive a network address to enable the UE 115 to obtain network service on a corresponding network. The network address may be a uniform resource identifier (URI) associated with the SIM on the network. When the UE 115 is registered on multiple networks, and hence has multiple network addresses, the UE 115 may intelligently determine when to redirect a SIP INVITE to control on which of the multiple networks a communication session is established.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT)

device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-a, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A user may purchase subscriptions from different network providers that operate different networks. Each network may charge its own set of fees and the user's UE may be able to establish the same communication session (e.g., for a voice call, for streaming video, or the like) over any of the networks. The network providers, however, do not intelligently determine when to redirect a SIP INVITE to control on which of the multiple networks to establish a communication session. There may be instances when it may be better, from a cost perspective or from a perspective of channel quality of wireless communications channel, for a UE to establish a communication session using one network instead of another.

Figure 2:
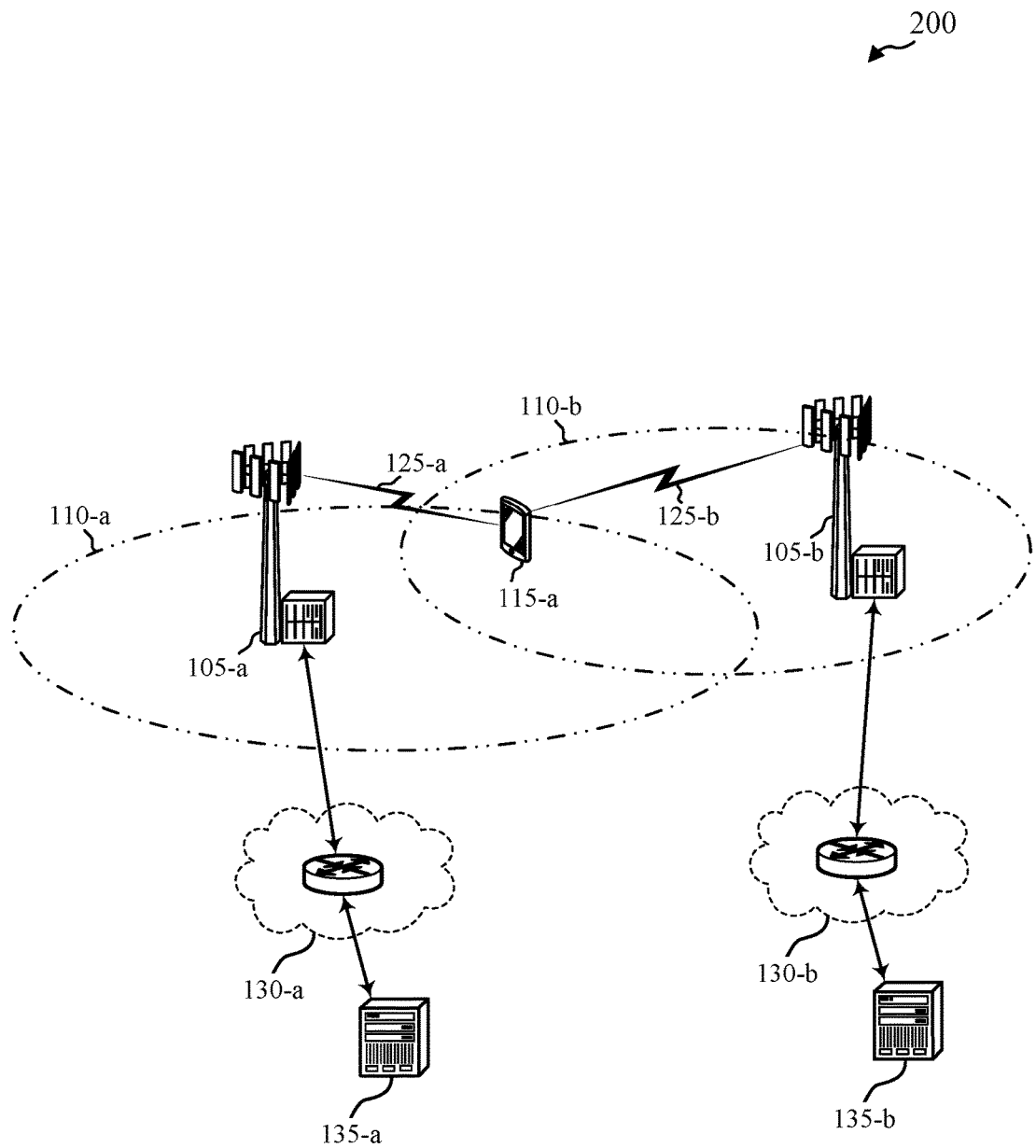
FIG. 2 illustrates an example of a wireless communication system that supports redirection of a SIP INVITE in accordance with aspects of the present disclosure.

The example embodiments permit a multi-SIM UE to intelligently determine when to redirect a SIP INVITE to control on which of the multiple networks a communication session is established. FIG. 2 illustrates an example of a wireless communications system 200 for redirection of a SIP INVITE. Wireless communication system 200 may include a first base station 105-a having a first coverage area 110-a, and a second base station 105-b having a second coverage area 110-b, and a multi-SIM UE 115-a within the first and second coverage areas 110-a, 110-b. Base stations 105-a, 105-b, are examples of base station 105, and multi-SIM UE 115-a is an example of UE 115 of FIG. 1. The multi-SIM UE 115-a may establish a connection via communication link 125-a and receive network service via base station 105-a operated by a first network provider. The multi-SIM UE 115-a may also establish a connection via communication link 125-b and receive network service via base station 105-b operated by a second network provider.

In an example, the multi-SIM UE 115-a may have two SIM cards each associated with a different unique identifier. The multi-SIM UE 115-a may send a first unique identifier of a first SIM to a first IMS server 135-a via base station 105-a to register for service on a first network operated by a first network provider. If registration is successful, the first IMS server 135-a may provide the multi-SIM UE 115-a with a first network address on the first network. The first network address may be a first uniform resource identifier (URI) associated with the first SIM on the first network. The multi-SIM UE 115-a may send a second unique identifier of a second SIM to a second IMS server 135-b via base station 105-b to register for service on a second network operated by a second network provider. If registration is successful, the second IMS server 135-b may provide the multi-SIM UE 115-a with a second network address on the second network. The second network address may be a second uniform resource identifier (URI) associated with the second SIM on the second network. The multi-SIM UE 115-a may have more than two SIM cards that each are associated with a different unique identifier that may be used to register with other IMS servers 135-a to obtain one or more additional network addresses on one or more additional networks. In other examples, a single base station 105 may provide the multi-SIM UE 115-a with connectivity to the different IMS servers 135-a, 135-b. In other examples, the different IMS servers 135-a, 135-b may be a single IMS server 135, such as when a multi-SIM UE 115-a may have different subscriptions with a same network provider.

In some instances, a calling UE 115 may send a SIP INVITE to the multi-SIM UE 115-a requesting establishment of a communication session via a first network. The multi-SIM UE 115-a may intelligently determine when to redirect the SIP INVITE to control on which of multiple networks the communication session is established.

Figure 3:
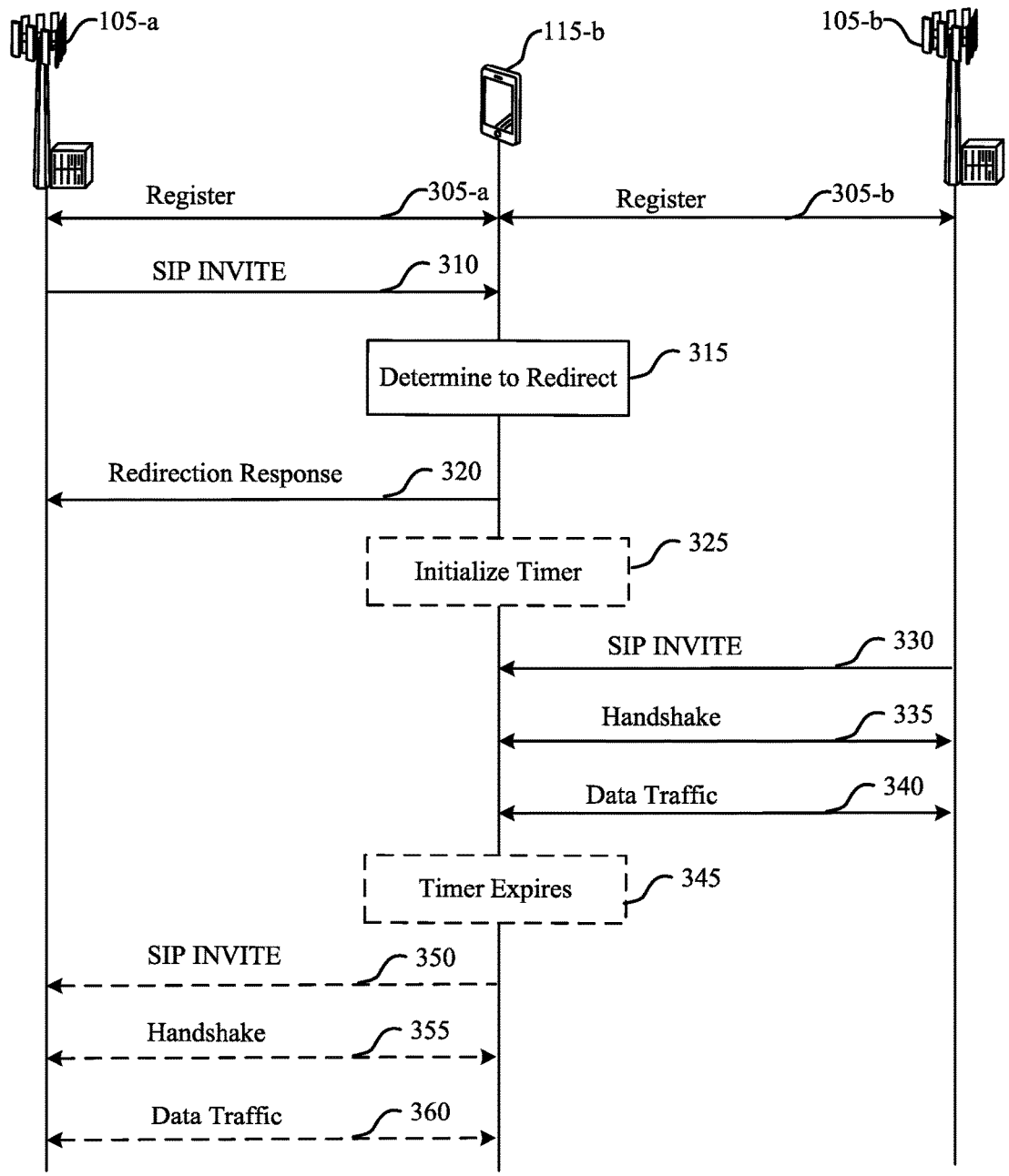
FIG. 3 illustrates an example of a process flow chart that supports redirection of a SIP INVITE in accordance with aspects of the present disclosure.

FIG. 3 illustrates an example process flow chart 300 for redirection of a SIP INVITE. At 305-a and 305-b, the multi-SIM UE 115-a may perform an IMS registration process to establish connections with multiple networks corresponding to subscriptions on the respective networks. For example, at 305-a, multi-SIM UE 115-a may initiate IMS registration with the first IMS server 135-a via base station 105-a to register a first subscription and may, at 305-b, may initiate an IMS registration with the second IMS server 135-b via base station 105-b to register a second subscription. The first subscription may be, for example, associated with a first voice over LTE radio access technology (RAT) provided by a first network provider. The second subscription may be, for example, associated with a different voice over LTE radio access technology (RAT) provided by a second network provider.

Upon successful completion of the IMS registration with the first IMS server 135-a, the multi-SIM UE 115-a may receive a first network address on a first network. Upon successful completion of the IMS registration with the second IMS server 135-b, the multi-SIM UE 115-b may receive a second network address on a second network. Operations 305-a and 305-b may occur simultaneously or at different times. As noted above, a single base station 105 may provide the multi-SIM UE 115-a with connectivity to the different IMS servers 135-a, 135-b, and the different IMS servers 135-a, 135-b may be a single IMS server 135. Also, the multi-SIM UE 115-a may include more than two SIM cards and may perform IMS registration to obtain a network address on each network.

At 310, the multi-SIM UE 115-a may receive a SIP INVITE via base station 105-a from a calling UE 115. The SIP INVITE may include the first network address on the first network that was assigned to the multi-SIM UE 115-a during IMS registration. The SIP INVITE may include a request to establish a communication session (e.g., a voice call) via the first network. The SIP INVITE may be a request to establish a SIP session and may also include a network address of the calling UE 115 on the first network.

At 315, the multi-SIM UE 115-a may determine to redirect the SIP INVITE so that the communication session is established via a different network. Here, the multi-SIM UE 115-a may determine to attempt to have the requested session be established by a second network via base station 105-b. Additional aspects for determining when to redirect the SIP INVITE are later described in FIG. 4.

At 320, the multi-SIM UE 115-a may communicate a redirection response via the first base station 105-a. The redirection response may request that the communication session be established via a second network, instead of via the first network. In an example, the redirection response may be a SIP redirection response that includes a second network address of the multi-SIM UE 115-a on the second network. The second network address may be URI of the multi-SIM UE 115-a associated with a home subscription. The SIP redirection response may be, for example, a SIP 300 response, a SIP 301 response, a SIP 302 response, a SIP 305 response, or a SIP 380 response. Generally, any SIP redirection response may be used for replying to the SIP INVITE to decline establishing the requested communication session via a first network, and to provide an indication that the communication session may instead be established via a second network using a network address of the multi-SIM UE 115-a on the second network.

In an example, the SIP redirection response may be routed to the calling UE 115, and the calling UE 115 may generate a second SIP INVITE that is sent to the multi-SIM UE 115-a via the second network. The user of the calling UE 115 may be prompted to approve sending the second SIP INVITE, or the calling UE 115 may automatically send the SIP INVITE. In another example, the SIP redirection response may not be routed all the way to the calling UE 115, and instead may be routed to some network entity (e.g., a network server). The network entity may be tasked with generating a second SIP INVITE that is sent to the multi-SIM UE 115-a via the second network. If the communication session ends up being established via the second network, the network entity may manage session set-up and tear down for the calling UE 115.

In some instances, the calling UE 115 may not be aware that the communication session is being routed over the second network instead of over the first network.

At 325, the multi-SIM UE 115-*a* may initialize a timer upon sending of the redirection response. Block 325 is shown with dashed lines as it, and block 345 discussed below, are optional and may be skipped. The multi-SIM UE 115-*a* may use the timer to terminate the redirection response should the multi-SIM UE 115-*a* be unable to successfully establish the communication session via the second network before the timer expires.

At 330, the multi-SIM UE 115-*a* may receive a SIP INVITE via base station 105-*b* requesting to establish a communication session via the second network. The SIP INVITE may include the second network address on the second network that was assigned to the multi-SIM UE 115-*a* during IMS registration.

At 335, the multi-SIM UE 115-*a* may perform a handshake for establishing a communication session with the calling UE 115 via the second network. As part of the handshake, the multi-SIM UE 115-*a* may send a SIP acceptance response in reply to the SIP INVITE to notify the calling UE 115 that the SIP INVITE is being accepted and to proceed with signaling for setting up the SIP session via the second network. The calling UE 115 may transmit an acknowledgement to the SIP acceptance response on the second network to complete the handshake and establish the SIP session on the second network.

At 340, the multi-SIM UE 115-*a* may exchange data traffic with the calling UE 115 over the established communication session via the second network.

In some instances, the UE 115-*a* may be unable to complete one or more of operations 330 and 335, and hence may fail to establish a communication session before expiration of the timer that was initialized at 325. Instead of failing to establish the communication session, the multi-SIM UE 115-*a* may attempt to establish the communication session via the first network, as described in operations 350, 355, and 360.

At 345, the multi-SIM UE 115-*a* may determine that the timer has expired prior to establishing a communication session via the second network.

At 350, the multi-SIM UE 115-*a* may transmit a SIP INVITE to the first network via the base station 105-*a*. The SIP INVITE may include the network address for the calling UE 115 on the first network that was received in the SIP INVITE at 310.

At 355, the multi-SIM UE 115-*a* may perform a handshake for establishing a communication session via the first network.

At 360, the multi-SIM UE 115-*a* may exchange data traffic with the calling UE 115 over the established communication session via the first network.

The operations of FIG. 3 may be repeated one or more times, may include additional or fewer steps, selected operations may be omitted or repeated, and the like.

Figure 4:
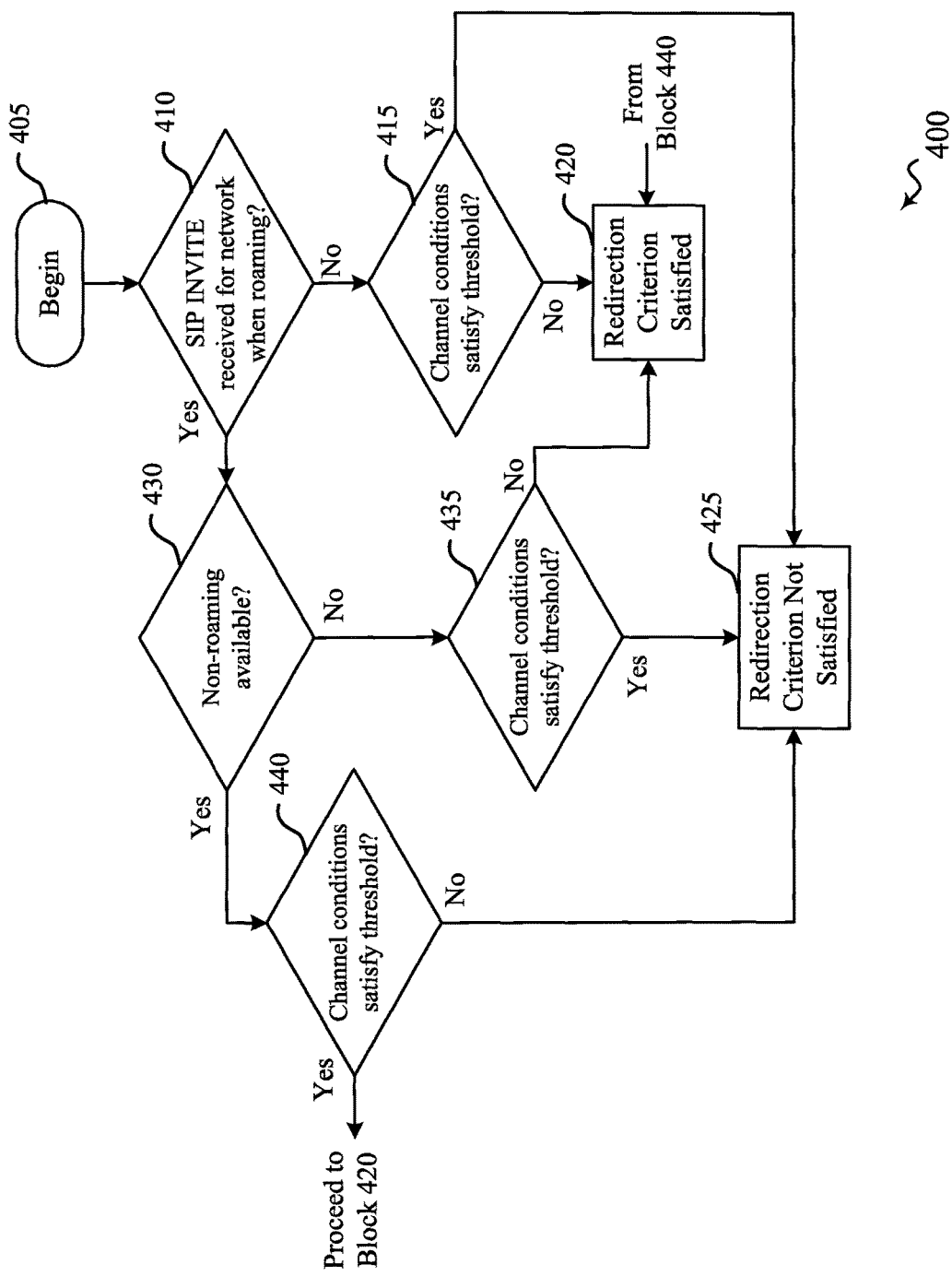
FIG. 4 illustrates an example of a flow diagram that supports redirection of a SIP INVITE in accordance with aspects of the present disclosure.

Referring again to operation 315, the multi-SIM UE 115-*a* may determine whether to reply to a received SIP INVITE with a SIP redirection response based at least in part on whether a redirection criterion is satisfied. FIG. 4 illustrates an example of a flow chart 400 for redirection of a session initiation protocol INVITE. The multi-SIM UE may apply a redirection criterion to intelligently determine when to reply to a received SIP INVITE with a SIP redirection response to control on which of the multiple networks a communication session is established. For example, the redirect criterion may be based at least in part on whether the multi-SIM UE 115-*a* is roaming on one network (but not another), whether the first network or second network has satisfactory conditions on its wireless communication channel, or the like.

The flow diagram may begin 405 and may proceed to block 410 when the multi-SIM UE 115-*a* receives a SIP INVITE via a first network.

At block 410, the multi-SIM UE 115-*a* may determine whether the SIP INVITE was received from a network on which the multi-SIM UE 115-*a* is deemed to be roaming (e.g., a non-home network). For example, the multi-SIM UE 115-*a* may IMS register with multiple networks. In some instances, a user obtains a subscription on a network that provides the multi-SIM UE 115-*a* of the user with service when roaming, but at a higher cost. If not roaming, the flow diagram 400 may proceed to block 415. If the multi-SIM UE 115-*a* would be deemed to be roaming if a communication session is established on the network, the flow diagram 400 may proceed to block 430.

At block 415, the multi-SIM UE 115-*a* may determine whether channel conditions on a network (e.g., on a home network) would satisfy a channel conditions threshold. The channel conditions threshold may correspond to a minimum signal to noise ratio on the channel, a minimum signal to noise plus interference ratio on the channel, a minimum data rate that the channel can support, a packet or bit error rate of the channel, other indicator of a poor RF channel condition, or the like. If the channel conditions do not satisfy the threshold, the flow diagram 400 may proceed to block 420. If the channel conditions satisfy the threshold, the flow diagram 400 may proceed to block 425.

At block 420, the multi-SIM UE 115-*a* may determine that the redirection criterion is satisfied. By following path 410, 415 to 420 of flow diagram 400, the multi-SIM UE 115-*a* has determined that the SIP INVITE is requesting to establish a communication session via a network where the multi-SIM UE 115-*a* is not roaming (e.g., on a home network), but does not have satisfactory channel conditions, and hence the multi-SIM UE 115-*a* replies to a received SIP INVITE with a SIP redirection response to request that the communication session be established via a different network (e.g., a non-home network). The multi-SIM UE 115-*a* may, with brief reference again to FIG. 3, send a SIP redirection response at 320. In some examples, the multi-SIM UE 115-*a* may only proceed from 415 to 420 of flow diagram 400 if the channel conditions on the different network (e.g., non-home network) satisfy the threshold. Otherwise, the multi-SIM UE 115-*a* may proceed to block 425.

At block 425, the multi-SIM UE 115-*a* may determine that the redirection criterion is not satisfied. By following path 410, 415 to 425 of flow diagram 400, the multi-SIM UE 115-*a* has determined that the SIP INVITE is requesting to establish a communication session via a network where the multi-SIM UE 115-*a* is not roaming and has satisfactory channel conditions, and hence the multi-SIM UE 115-*a* does not reply to a received SIP INVITE with a SIP redirection response. Instead, the multi-SIM UE 115-*a* may initiate a handshake for establishing the communication session via the network.

At block 430, the multi-SIM UE 115-*a* may determine if it is registered with a different network where the multi-SIM UE 115-*a* is not roaming. If roaming on all other networks, the flow diagram 400 may proceed to block 435. If not roaming on at least one other network, the flow diagram 400 may proceed to block 440.

At block 435, the multi-SIM UE 115-*a* may determine whether channel conditions on a network on which the SIP INVITE was received would satisfy the channel conditions threshold. Because the multi-SIM UE 115-*a* may not have any non-roaming alternatives, the multi-SIM UE 115-*a* may determine whether the network (e.g., non-home network) on which the SIP INVITE was received would satisfy the channel conditions threshold. If not satisfied, the multi-SIM UE 115-*a* may proceed to block 420 and determine that the redirection criterion is satisfied. Thus, the multi-SIM UE 115-*a* may reply to a received SIP INVITE with a SIP redirection response. For example, the multi-SIM UE 115-*a* may receive the SIP INVITE for establishing a communication session via first and second networks, and the multi-SIM UE 115-*a* may be roaming on each. The multi-SIM UE 115-*a* may determine that the channel conditions of the first network are not satisfactory, and may reply to a received SIP INVITE with a SIP redirection response for establishing the communication session via the second network, wherein the multi-SIM UE 115-*a* is also roaming. In some examples, the multi-SIM UE 115-*a* may only proceed from 435 to 420 of flow diagram 400 if the channel conditions on the different network satisfies the channel conditions threshold. Otherwise, the multi-SIM UE 115-*a* may proceed to block 425.

At block 440, the multi-SIM UE 115-*a* may determine whether channel conditions on a network on which it is not roaming would satisfy a channel conditions threshold. If the channel conditions satisfy the threshold, the flow diagram 400 may proceed to block 420. By following path 410, 430, 440 to 420 of flow diagram 400, the multi-SIM UE 115-*a* determines that it has received a SIP INVITE requesting to establish a communication session network where it is roaming. The multi-SIM UE 115-*a* may reply to the received SIP INVITE with a SIP redirection response for establishing the communication session via the second network (e.g., a home network) where it is not roaming and has satisfactory channel conditions. By following path 410, 430, 440 to 425 of flow diagram 400, the multi-SIM UE 115-*a* determines that it has received a SIP INVITE for establishing a communication session via a first network where it is roaming. The multi-SIM UE 115-*a*, however, does not reply to the received SIP INVITE with a SIP redirection response for establishing the communication session via a second network where it is not roaming because the second network does not have satisfactory channel conditions.

The flow diagram 400 described in FIG. 4 may be simplified to provide a simpler redirection criterion. In a first example, the redirection criterion may only consider whether the multi-SIM UE 115-*a* is roaming. If roaming, the multi-SIM UE 115-*a* may determine that the redirection criterion is satisfied, and, if not roaming, the multi-SIM UE 115-*a* may determine that the redirection criterion is not satisfied. In a second example, the redirection criterion may only consider channel conditions. If the channel conditions of the first network do not satisfy the threshold (e.g., SNR below a minimum value for SNR), the UE 115-*a* may determine that the redirection criterion is satisfied. Conversely, if the channel conditions of the first network satisfy the threshold (e.g., SNR meets or exceeds a minimum value for SNR), the UE 115-*a* may determine that the redirection criterion is not satisfied. The redirection criterion is not limited to roaming and channel conditions, and these and other parameters may be used to make redirection decisions, additionally, or alternatively to roaming and channel conditions. For example, cost for services on two or more networks (e.g., select cheapest network), congestion on two or more networks (e.g., select least congested network), any combination thereof, or the like, may be used alone or in any combination with roaming and/or channel conditions for determining whether a redirection criterion is satisfied. Moreover, the examples described herein discuss the UE 115-*a* having subscriptions on two networks. The principles described herein are applicable to a UE 115-*a* having subscriptions on more than two networks.

Beneficially, the examples permit a multi-SIM UE 115-*a* to control over which network a communication session is established. In some instances, the multi-SIM UE 115-*a* may determine it is preferable to establish a requested communication session over a different network than indicated in a received SIP INVITE. Moreover, the calling UE may be agnostic to the redirection of the communication session, as the calling UE may occur no more than a nominal amount of network delay than is required to establish a communication session over a different network. Further, a network entity (e.g., on the second network) may perform session setup via the different network without requiring the calling UE to perform any additional signaling nor requiring the calling UE to incur any additional charges.

Figure 5:
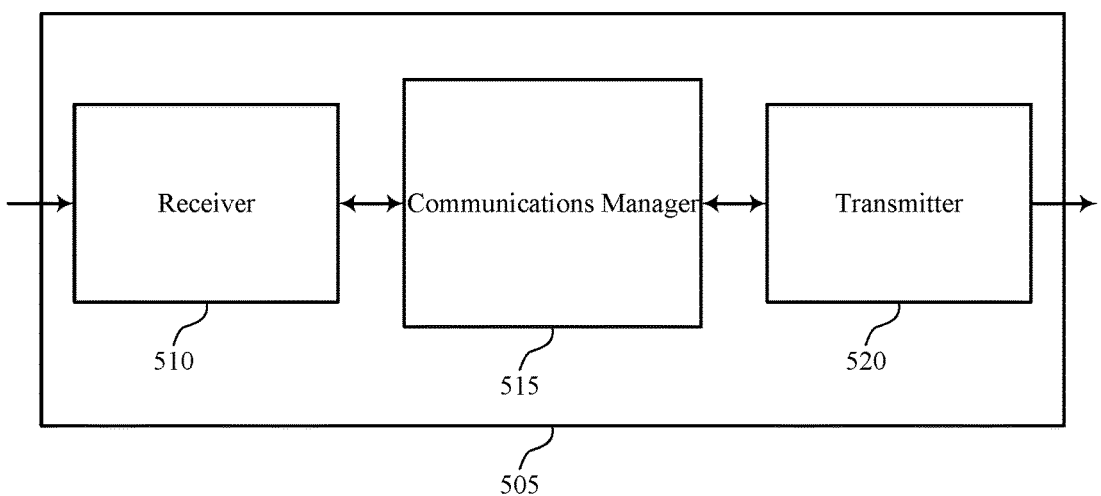
FIGS. 5 through 7 show block diagrams of a device that supports redirection of a SIP INVITE in accordance with aspects of the present disclosure.

FIG. 5 shows a block diagram 500 of a wireless device 505 that supports redirection of a SIP INVITE in accordance with various aspects of the present disclosure. Wireless device 505 may be an example of aspects of a user equipment (UE) 115 as described with reference to FIG. 1. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to redirection of a session initiation protocol INVITE, etc.). Information may be passed on to other components of the device. The receiver 510 may be an example of aspects of the transceiver 835 described with reference to FIG. 8.

Receiver 510 may receive a SIP INVITE from a first UE requesting to establish a SIP session on a first network, the SIP INVITE including a first network address of the multi-SIM UE that is associated with a first SIM of the multi-SIM UE. During session establishment, receiver 510 may receive an acknowledgment of a SIP acceptance response that completes a handshake and establishes a SIP session on a second network. Receiver 510 may also receive a second SIP INVITE from a first UE requesting to establish a second SIP session on the second network.

Communications manager 515 may be an example of aspects of the communications manager 815 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may determine that a redirection criterion is satisfied.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Transmitter 520 may, based on a determination that a redirection criterion is satisfied, transmit a SIP redirection response including a second network address of the multi-SIM UE on a second network that is associated with a second SIM of the multi-SIM UE, transmit a second SIP redirection response that includes the second network address, and transmit a SIP acceptance response to indicate acceptance of a second SIP INVITE. In some cases, the SIP redirection response is one of a SIP 300 response, a SIP 301 response, a SIP 302 response, a SIP 305 response, or a SIP 380 response.

Figure 6:
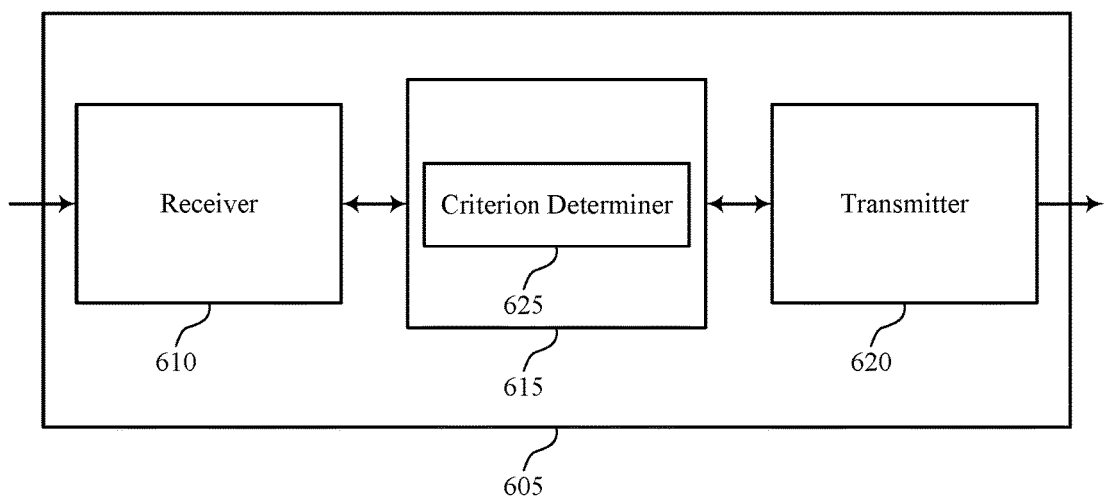

FIG. 6 shows a block diagram 600 of a wireless device 605 that supports redirection of a SIP INVITE in accordance with various aspects of the present disclosure. Wireless device 605 may be an example of aspects of a wireless device 505 or a UE 115 as described with reference to FIGS. 1 and 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to redirection of a session initiation protocol INVITE, etc.). Information may be passed on to other components of the device. The receiver 610 may be an example of aspects of the transceiver 835 described with reference to FIG. 8.

Communications manager 615 may be an example of aspects of the communications manager 815 described with reference to FIG. 8.

Communications manager 615 may also include criterion determiner 625.

Criterion determiner 625 may determine that a redirection criterion is satisfied. In some cases, determining that the redirection criterion is satisfied includes: determining that a first condition of a first communication channel associated with the first network does not satisfy a threshold and that a second condition of a second communication channel associated with the second network satisfies the threshold. In some cases, determining that the redirection criterion is satisfied includes determining that the first network is a non-home network and the second network is a home network.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
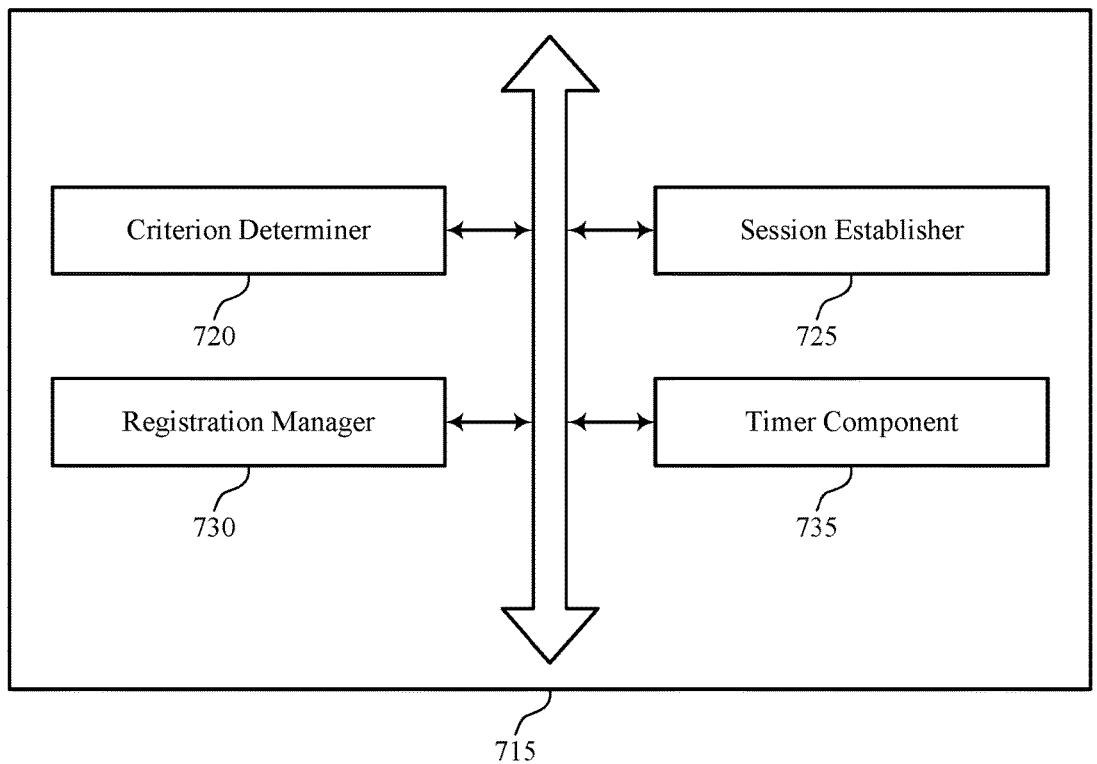

FIG. 7 shows a block diagram 700 of a communications manager 715 that supports redirection of a SIP INVITE in accordance with various aspects of the present disclosure. The communications manager 715 may be an example of aspects of a communications manager 515, a communications manager 615, or a communications manager 815 described with reference to FIGS. 5, 6, and 8. The communications manager 715 may include criterion determiner 720, session establisher 725, registration manager 730, and timer component 735. Each of these modules may communicate, directly or indirectly, with one another (e.g., via one or more buses).

Criterion determiner 720 may determine that a redirection criterion is satisfied. In some cases, determining that the redirection criterion is satisfied includes: determining that a first condition of a first communication channel associated with the first network does not satisfy a threshold and that a second condition of a second communication channel associated with the second network satisfies the threshold. In some cases, determining that the redirection criterion is satisfied includes determining that the first network is a non-home network and the second network is a home network.

Session establisher 725 may establish a SIP session on a second network based on the second network address. In some cases, establishing the SIP session on the second network includes: initiating a handshake for establishment of the SIP session on the second network based on receiving a second SIP INVITE requesting to establish the SIP session on the second network. In some cases, session establisher 725 may establish a SIP session on the first network based on determining that a timer has expired.

Registration manager 730 may perform a first Internet Protocol Multimedia Subsystem (IMS) registration procedure to register a first subscription associated with the first SIM with the first network and to obtain the first network address for the multi-SIM UE on the first network, and perform a second IMS registration procedure to register a second subscription associated with the second SIM with the second network and to obtain the second network address for the multi-SIM UE on the second network. In some cases, the first network address is a uniform resource identifier (URI) associated with the first SIM on the first network and the second network address is a URI associated with the second SIM on the second network.

Timer component 735 may initiate a timer based on a transmission time of the SIP redirection response, terminate the timer prior to expiration of the timer based on determining successful establishment of the SIP session on the second network, and initiate the timer based on a transmission time of a second SIP redirection response.

Figure 8:
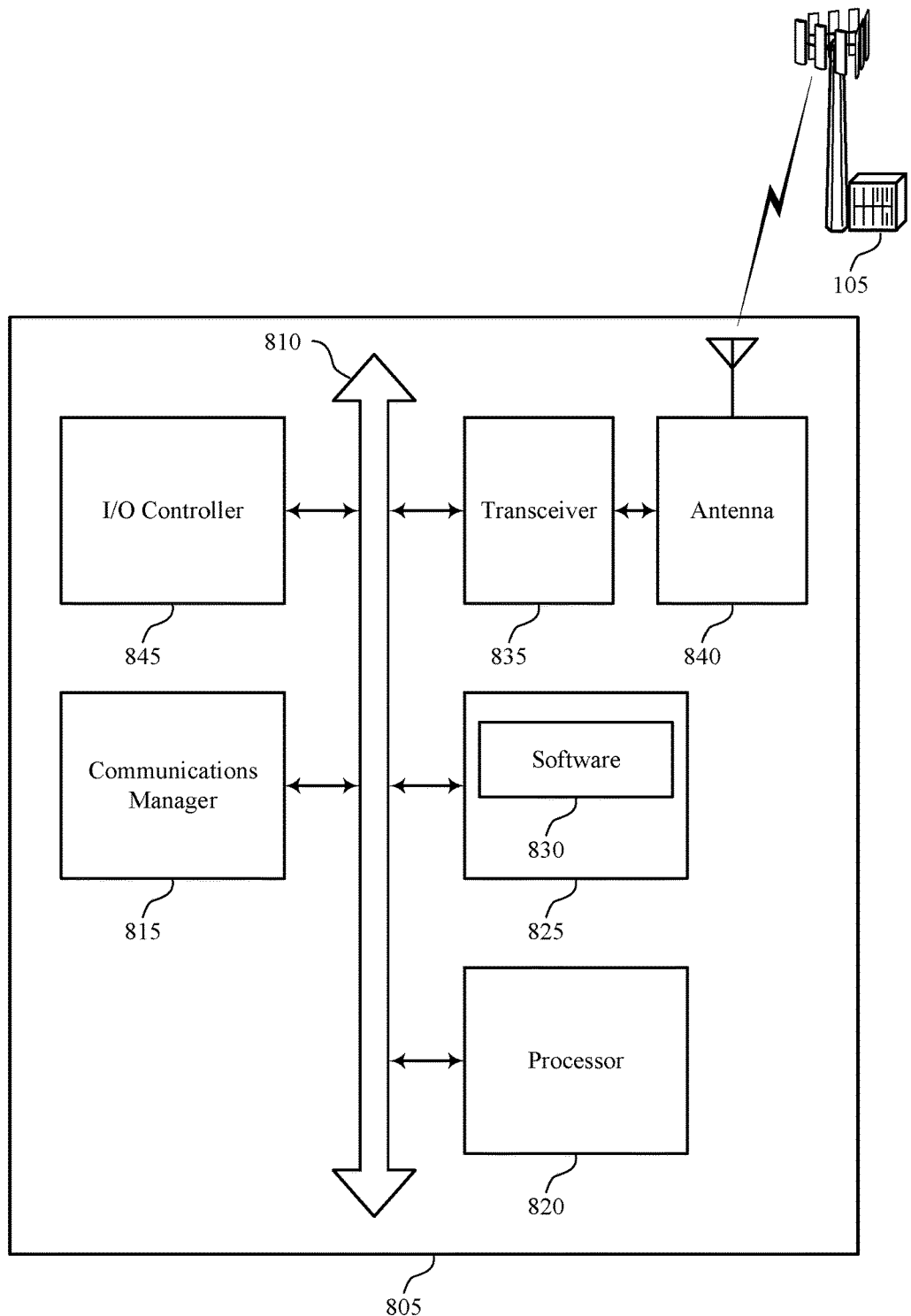
FIG. 8 illustrates a block diagram of a system including a UE that supports redirection of a SIP INVITE in accordance with aspects of the present disclosure.

FIG. 8 shows a diagram of a system 800 including a device 805 that supports redirection of a SIP INVITE in accordance with various aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including communications manager 815, processor 820, memory 825, software 830, transceiver 835, antenna 840, and I/O controller

845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting redirection of a session initiation protocol INVITE).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support redirection of a session initiation protocol INVITE. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
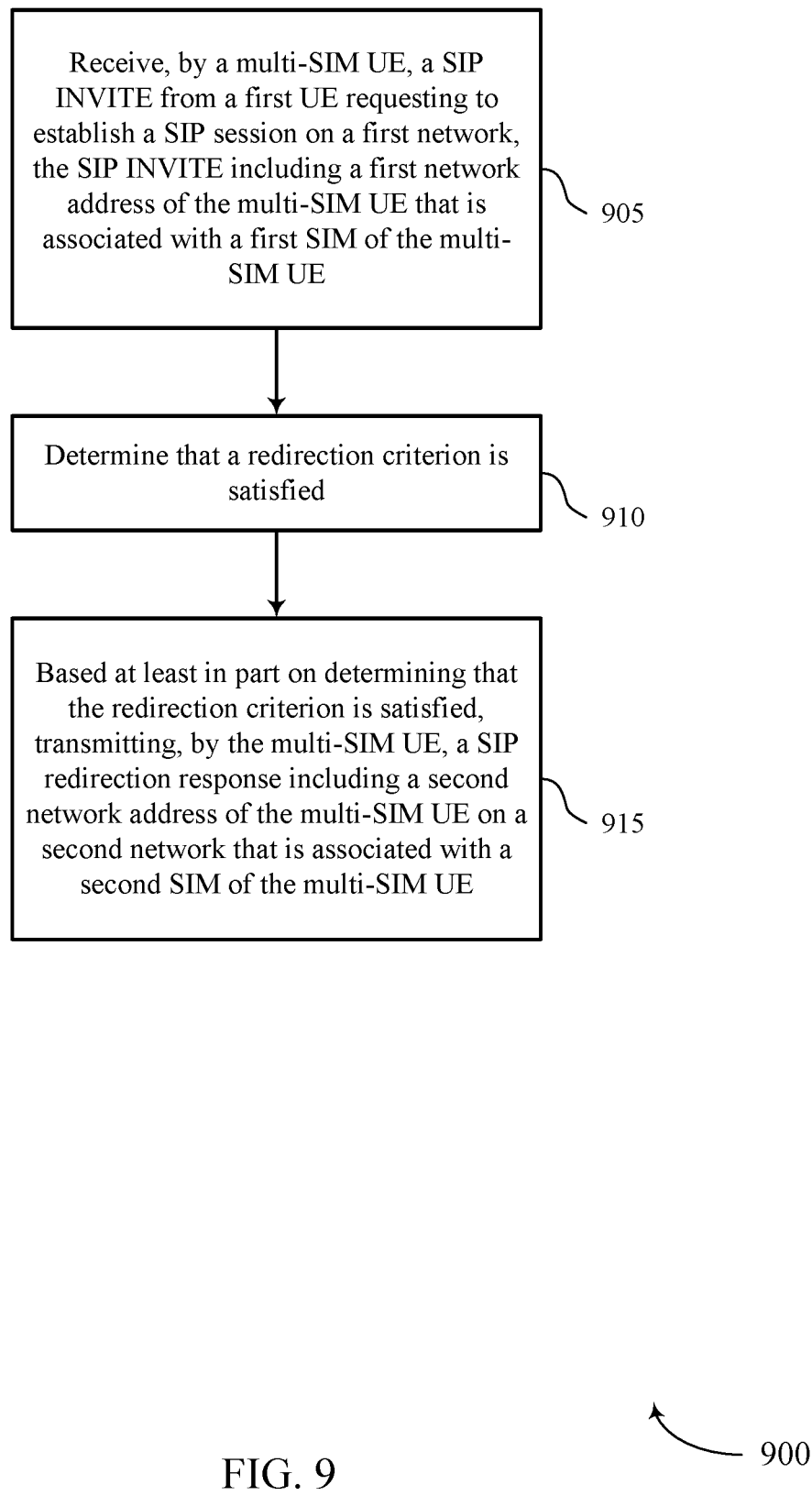
FIGS. 9 through 11 illustrate methods for redirection of a SIP INVITE in accordance with aspects of the present disclosure.

FIG. 9 shows a flowchart illustrating a method 900 for redirection of a SIP INVITE in accordance with various aspects of the present disclosure. The operations of method 900 may be implemented by a multi-SIM UE 115 or its components as described herein. For example, the operations of method 900 may be performed by a communications manager as described with reference to FIGS. 5 through 8.

In some examples, a UE 115 may execute a set of codes to control the functional elements of the device to perform the functions described below. Additionally or alternatively, the UE 115 may perform aspects of the functions described below using special-purpose hardware.

At block 905 the multi-SIM UE 115 may receive a SIP INVITE from a first UE requesting to establish a SIP session on a first network, the SIP INVITE including a first network address of the multi-SIM UE 115 that is associated with a first SIM of the multi-SIM UE 115. The operations of block 905 may be performed according to the methods described with reference to FIGS. 1 through 4. In certain examples, aspects of the operations of block 905 may be performed by a receiver as described with reference to FIGS. 5 through 8.

At block 910 the multi-SIM UE 115 may determine that a redirection criterion is satisfied. The operations of block 910 may be performed according to the methods described with reference to FIGS. 1 through 4. In certain examples, aspects of the operations of block 910 may be performed by a criterion determiner as described with reference to FIGS. 5 through 8.

At block 915 the multi-SIM UE 115 may, based at least in part on determining that the redirection criterion is satisfied, transmit a SIP redirection response including a second network address of the multi-SIM UE 115 on a second network that is associated with a second SIM of the multi-SIM UE 115. The operations of block 915 may be performed according to the methods described with reference to FIGS. 1 through 4. In certain examples, aspects of the operations of block 915 may be performed by a transmitter as described with reference to FIGS. 5 through 8.

Figure 10:
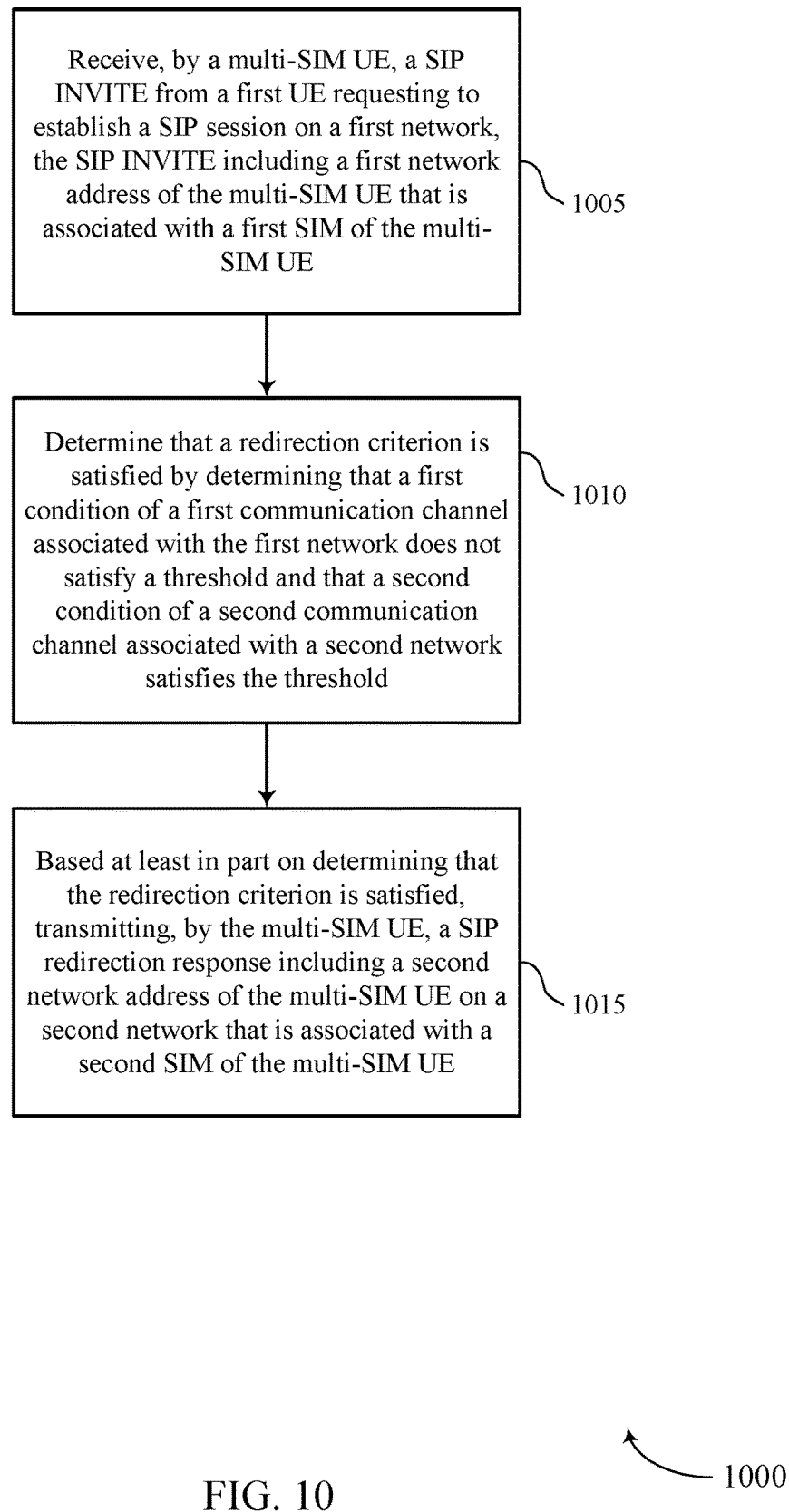

FIG. 10 shows a flowchart illustrating a method 1000 for redirection of a SIP INVITE in accordance with various aspects of the present disclosure. The operations of method 1000 may be implemented by a UE 115 or its components as described herein. For example, the operations of method 1000 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the multi-SIM UE 115 may receive a SIP INVITE from a first UE requesting to establish a SIP session on a first network, the SIP INVITE including a first network address of the multi-SIM UE 115 that is associated with a first SIM of the multi-SIM UE 115. The operations of block 1005 may be performed according to the methods described with reference to FIGS. 1 through 4. In certain examples, aspects of the operations of block 1005 may be performed by a receiver as described with reference to FIGS. 5 through 8.

At block 1010 the multi-SIM UE 115 may determine that a redirection criterion is satisfied by determining that a first condition of a first communication channel associated with the first network does not satisfy a threshold and that a second condition of a second communication channel associated with the second network satisfies the threshold. The operations of block 1010 may be performed according to the methods described with reference to FIGS. 1 through 4. In certain examples, aspects of the operations of block 1010 may be performed by a criterion determiner as described with reference to FIGS. 5 through 8.

At block 1015 the multi-SIM UE 115 may, based at least in part on determining that the redirection criterion is satisfied, transmit a SIP redirection response including a second network address of the multi-SIM UE 115 on a second network that is associated with a second SIM of the multi-SIM UE 115. The operations of block 1015 may be performed according to the methods described with reference to FIGS. 1 through 4. In certain examples, aspects of the operations of block 1015 may be performed by a transmitter as described with reference to FIGS. 5 through 8.

Figure 11:
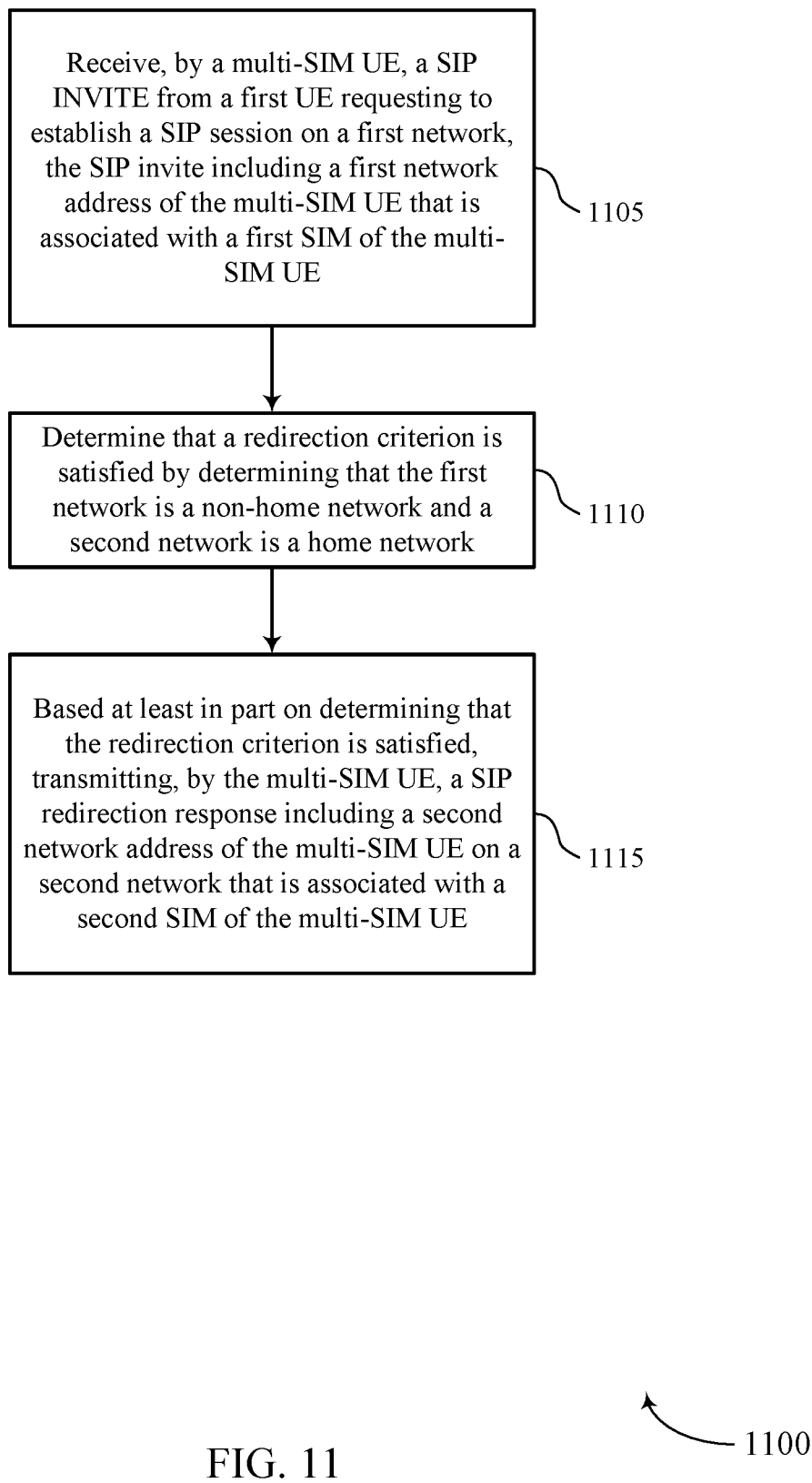

FIG. 11 shows a flowchart illustrating a method 1100 for redirection of a SIP INVITE in accordance with various aspects of the present disclosure. The operations of method 1100 may be implemented by a UE 115 or its components as described herein. For example, the operations of method 1100 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the multi-SIM UE 115 may receive a SIP INVITE from a first UE requesting to establish a SIP session on a first network, the SIP INVITE including a first network address of the multi-SIM UE 115 that is associated with a first SIM of the multi-SIM UE 115. The operations of block 1105 may be performed according to the methods described with reference to FIGS. 1 through 4. In certain examples, aspects of the operations of block 1105 may be performed by a receiver as described with reference to FIGS. 5 through 8.

At block 1110 the multi-SIM UE 115 may determine that a redirection criterion is satisfied by determining that the first network is a non-home network and the second network is a home network. The operations of block 1110 may be performed according to the methods described with reference to FIGS. 1 through 4. In certain examples, aspects of the operations of block 1110 may be performed by a criterion determiner as described with reference to FIGS. 5 through 8.

At block 1115 the multi-SIM UE 115 may, based at least in part on determining that the redirection criterion is satisfied, transmit a SIP redirection response including a second network address of the multi-SIM UE 115 on a second network that is associated with a second SIM of the multi-SIM UE 115. The operations of block 1115 may be performed according to the methods described with reference to FIGS. 1 through 4. In certain examples, aspects of the operations of block 1115 may be performed by a transmitter as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, by a multi-subscriber identification module user equipment (multi-SIM UE), a session initiation protocol (SIP) INVITE from a first user equipment (UE) requesting to establish a SIP session on a first network, the SIP INVITE including a first network address of the multi-SIM UE that is associated with a first SIM of the multi-SIM UE;
determining that a redirection criterion is satisfied; and
based at least in part on determining that the redirection criterion is satisfied, transmitting, by the multi-SIM UE in response to the SIP INVITE received from the first UE, a SIP redirection response including a second network address of the multi-SIM UE on a second network that is associated with a second SIM of the multi-SIM UE.

2. The method of claim 1, wherein determining that the redirection criterion is satisfied comprises:
determining that a first condition of a first communication channel associated with the first network does not satisfy a threshold; and
determining that a second condition of a second communication channel associated with the second network satisfies the threshold.

3. The method of claim 1, wherein determining that the redirection criterion is satisfied comprises:
determining that the first network is a non-home network and the second network is a home network.

4. The method of claim 1, further comprising:
establishing, by the multi-SIM UE, the SIP session on the second network based at least in part on the second network address.

5. The method of claim 4, wherein establishing the SIP session on the second network comprises:
initiating a handshake for establishment of the SIP session on the second network based at least in part on receiving a second SIP INVITE requesting to establish the SIP session on the second network;
transmitting a SIP acceptance response to indicate acceptance of the second SIP INVITE; and
receiving an acknowledgment of the SIP acceptance response that completes the handshake and establishes the SIP session on the second network.

6. The method of claim 1, further comprising:
performing a first Internet Protocol Multimedia Subsystem (IMS) registration procedure to register a first subscription associated with the first SIM with the first network and to obtain the first network address for the multi-SIM UE on the first network; and
performing a second IMS registration procedure to register a second subscription associated with the second SIM with the second network and to obtain the second network address for the multi-SIM UE on the second network.

7. The method of claim 1, further comprising:
initiating a timer based at least in part on a transmission time of the SIP redirection response; and
terminating the timer prior to expiration of the timer based at least in part on determining successful establishment of the SIP session on the second network.

8. The method of claim 7, further comprising:
receiving a second SIP INVITE from the first UE or a second UE requesting to establish a second SIP session on the first network;
transmitting a second SIP redirection response that includes the second network address;
initiating the timer based at least in part on a transmission time of the second SIP redirection response; and
establishing the second SIP session on the first network based at least in part on determining that the timer has expired.

9. The method of claim 1, wherein the first network address is a uniform resource identifier (URI) associated with the first SIM on the first network and the second network address is a URI associated with the second SIM on the second network.

10. The method of claim 1, wherein the SIP redirection response is one of a SIP 300 response, a SIP 301 response, a SIP 302 response, a SIP 305 response, or a SIP 380 response.

11. An apparatus for wireless communication, in a system comprising:
a processor;
memory in electronic communication with the processor; and
instructions stored in the memory and operable, when executed by the processor, to cause the apparatus to:
receive a session initiation protocol (SIP) INVITE from a first user equipment (UE) requesting to establish a SIP session on a first network, the SIP INVITE including a first network address of a multi-subscriber identification module user equipment (multi-SIM UE) that is associated with a first SIM of the multi-SIM UE;
determine that a redirection criterion is satisfied; and
based at least in part on determining that the redirection criterion is satisfied, transmit, in response to the SIP INVITE received from the first UE, a SIP redirection response including a second network address of the multi-SIM UE on a second network that is associated with a second SIM of the multi-SIM UE.

12. The apparatus of claim 11, wherein the instructions to cause the apparatus to determine that the redirection criterion is satisfied further comprise instructions executable by the processor to:
determine that a first condition of a first communication channel associated with the first network does not satisfy a threshold; and
determine that a second condition of a second communication channel associated with the second network satisfies the threshold.

13. The apparatus of claim 11, wherein the instructions to cause the apparatus to determine that the redirection criterion is satisfied comprise instructions executable by the processor to:
determine that the first network is a non-home network and the second network is a home network.

14. The apparatus of claim 11, wherein the instructions are further executable by the processor to:
establish the SIP session on the second network based at least in part on the second network address.

15. The apparatus of claim 14, wherein the instructions to cause the apparatus to establish the SIP session on the second network comprise instructions executable by the processor to:
initiate a handshake for establishment of the SIP session on the second network based at least in part on receiving a second SIP INVITE requesting to establish the SIP session on the second network;
transmit a SIP acceptance response to indicate acceptance of the second SIP INVITE; and receive an acknowledgment of the SIP acceptance response that completes the handshake and establishes the SIP session on the second network.

16. The apparatus of claim 11, wherein the instructions are further executable by the processor to:
perform a first Internet Protocol Multimedia Subsystem (IMS) registration procedure to register a first subscription associated with the first SIM with the first network and to obtain the first network address for the multi-SIM UE on the first network; and
perform a second IMS registration procedure to register a second subscription associated with the second SIM with the second network and to obtain the second network address for the multi-SIM UE on the second network.

17. The apparatus of claim 11, wherein the instructions are further executable by the processor to:
initiate a timer based at least in part on a transmission time of the SIP redirection response; and
terminate the timer prior to expiration of the timer based at least in part on determining successful establishment of the SIP session on the second network.

18. The apparatus of claim 17, wherein the instructions are further executable by the processor to:
receive a second SIP INVITE from the first UE or a second UE requesting to establish a second SIP session on the first network;
transmit a second SIP redirection response that includes the second network address;
initiate the timer based at least in part on a transmission time of the second SIP redirection response; and
establish the second SIP session on the first network based at least in part on determining that the timer has expired.

19. The apparatus of claim 11, wherein the first network address is a uniform resource identifier (URI) associated with the first SIM on the first network and the second network address is a URI associated with the second SIM on the second network.

20. The apparatus of claim 11, wherein the SIP redirection response is one of a SIP 300 response, a SIP 301 response, a SIP 302 response, a SIP 305 response, or a SIP 380 response.

21. An apparatus for wireless communication, comprising:
means for receiving a session initiation protocol (SIP) INVITE from a first user equipment (UE) requesting to establish a SIP session on a first network, the SIP INVITE including a first network address of a multi-subscriber identification module user equipment (multi-SIM UE) that is associated with a first SIM of the multi-SIM UE;
means for determining that a redirection criterion is satisfied; and
means for transmitting, in response to the SIP INVITE received from the first UE, a SIP redirection response including a second network address of the multi-SIM UE on a second network that is associated with a second SIM of the multi-SIM UE based at least in part on determining that the redirection criterion is satisfied.

22. The apparatus of claim 21, wherein means for determining that the redirection criterion is satisfied comprises:
means for determining that a first condition of a first communication channel associated with the first network does not satisfy a threshold; and
means for determining that a second condition of a second communication channel associated with the second network satisfies the threshold.

23. The apparatus of claim 21, wherein means for determining that the redirection criterion is satisfied comprises:
means for determining that the first network is a non-home network and the second network is a home network.

24. The apparatus of claim 21, further comprising:
means for establishing, by the multi-SIM UE, the SIP session on the second network based at least in part on the second network address.

25. The apparatus of claim 24, wherein means for establishing the SIP session on the second network comprises:
means for initiating a handshake for establishment of the SIP session on the second network based at least in part on receiving a second SIP INVITE requesting to establish the SIP session on the second network;
means for transmitting a SIP acceptance response to indicate acceptance of the second SIP INVITE; and
means for receiving an acknowledgment of the SIP acceptance response that completes the handshake and establishes the SIP session on the second network.

26. A non-transitory computer-readable medium storing code for wireless communication, the code comprising instructions executable by a processor to:
receive a session initiation protocol (SIP) INVITE from a first user equipment (UE) requesting to establish a SIP session on a first network, the SIP INVITE including a first network address of a multi-subscriber identification module user equipment (multi-SIM UE) that is associated with a first SIM of the multi-SIM UE;
determine that a redirection criterion is satisfied; and
based at least in part on determining that the redirection criterion is satisfied, transmit, in response to the SIP INVITE received from the first UE, a SIP redirection response including a second network address of the multi-SIM UE on a second network that is associated with a second SIM of the multi-SIM UE.

27. The non-transitory computer-readable medium of claim 26, wherein the instructions to cause the apparatus to determine that the redirection criterion is satisfied comprise instructions executable by the processor to:
determine that a first condition of a first communication channel associated with the first network does not satisfy a threshold; and
determine that a second condition of a second communication channel associated with the second network satisfies the threshold.

28. The non-transitory computer-readable medium of claim 26, wherein the instructions to cause the apparatus to determine that the redirection criterion is satisfied comprise instructions executable by the processor to:
determine that the first network is a non-home network and the second network is a home network.

29. The non-transitory computer-readable medium of claim 26, wherein the instructions are further executable by the processor to:
establish the SIP session on the second network based at least in part on the second network address.

30. The non-transitory computer-readable medium of claim 29, wherein the instructions to cause the apparatus to establish the SIP session on the second network comprise instructions executable by the processor to:
initiate a handshake for establishment of the SIP session on the second network based at least in part on receiving a second SIP INVITE requesting to establish the SIP session on the second network;

transmit a SIP acceptance response to indicate acceptance of the second SIP INVITE; and receive an acknowledgment of the SIP acceptance response that completes the handshake and establishes the SIP session on the second network.

* * * * *